United States Patent [19]

Stekelenburg

[11] Patent Number: 5,464,182
[45] Date of Patent: Nov. 7, 1995

[54] CLAMP-TYPE LAMP HOLDER

[75] Inventor: Albert Stekelenburg, Taipei, Taiwan

[73] Assignee: All Line Inc., Taipei, Taiwan

[21] Appl. No.: 160,066

[22] Filed: Nov. 30, 1993

[51] Int. Cl.$^6$ ..................................................... F21V 21/28
[52] U.S. Cl. ..................... 248/276.1; 248/278.1; 362/226; 362/275; 403/53; 403/164
[58] Field of Search ................. 248/225.31, 231.5, 248/276, 278; 403/53, 59, 60, 161, 164; 362/226, 275, 396, 927

[56] References Cited

U.S. PATENT DOCUMENTS

| | | | |
|---|---|---|---|
| 1,280,095 | 9/1918 | Smith | 248/278 |
| 2,717,141 | 9/1955 | Livingston | 403/53 X |
| 2,790,617 | 4/1957 | Harland | 248/278 |
| 3,193,674 | 7/1965 | Fleming | 248/278 X |
| 4,090,210 | 5/1978 | Wehling et al. | 248/278 X |
| 4,850,804 | 7/1989 | Huang | 248/278 X |
| 4,887,784 | 12/1989 | Kayali | 248/278 X |
| 5,054,737 | 10/1991 | DeLancey | 248/278 X |

Primary Examiner—Alvin C. Chin-Shue
Assistant Examiner—Derek J. Berger
Attorney, Agent, or Firm—W. Wayne Liauh

[57] ABSTRACT

An improved clamp-type lamp holder which allows the lamp head to be vertically adjusted and all the directional and angle adjustments can be effectuated above the clamp seat. The lamp holder comprises: (1) a lamp body, a holder clamp, a hanger, and a lamp head, the lamp stem comprising a stem body and a connection body; (2) a projecting post provided on the bottom end of the stem body which is inserted into a first hole provided in the top portion of the connection body; (3) a tubular plastic bushing for sleeving about the projection post within the connection body; (4) a threaded screw which is upwardly threaded into a thread hole in the projecting post of the stem body so as to affix the stem body with the connection body and form the lamp body via a washer which is disposed below the tubular plastic bushing; (5) a longitudinal groove formed near the lower end of the connection body; (6) a transversal notch formed near the longitudinal groove for receiving a long washer to be fitted therein, the transversal notch including a horizontal through hole; and (7) a hand screw to be inserted through the horizontal through hole in the transversal notch and another through hole provided in a projecting seat of the holder clamp so as to allow the stem body, the connection body, and the lamp clamp to be affixed together while allowing the lamp body to swing in a desired angle.

2 Claims, 4 Drawing Sheets

CLAMP-TYPE LAMP HOLDER

BACKGROUND OF THE INVENTION

Generally, the clamp type lamp holder is comprised of a lamp stem constructed of snake tubing that is positioned through random turning. Some defects exist and are as follows.

Because the snake tube is able to bend at a large arc, the adjustable range has limitations. Because of the limited length (max. 20 cm) of the snake tube that is applied to the clamp type lamp holder, the desired angle is difficult to adjust.

Because ring joints support the snake tubing, and are connected together, the joint could possibly become loose due to usage and/or aging. This limits the life span due to the decrease of the support force.

Because of limited support for the snake tube as mentioned above, the lamp head can only support the use of a lightweight common bulb and shell rather than heavier and better lamp heads (such as the halogen lamp).

For outdoor clamp type lamp holders (such as garden lamps), the lamp head is usually vertically adjustable but, because it is difficult to get the appropriate position for clamping, ideal illumination is not always attainable.

SUMMARY OF THE INVENTION

One objective of the present invention is to provide structural improvement for the clamp type lamp holder that allows the lamp head to be vertically adjusted and all direction and angle adjustments can be formed above the clamp seat, whereby ideal illumination can be angled and adjusted at any position where the lamp holder is clamped. The present invention relates to a connection body mounted on the lower side of a hard lamp stem. This connection body is upwardly fixed together with a post-type lamp stem that allows free rotation. The lower side pivots on a projecting seat of a holder damp and is secured with a screw, whereby the entire stem body permits free rotation. This also enables forward and backward swinging without the risk of becoming loose. In addition, the use of a hard lamp stem can strengthen the overall structure to prolong the life span and to allow the halogen lamp with transformer to be used for multiple purposes. The lamp holder could be used outdoors, such as a gardening lamp, and for the backyard, etc.

DETAILED DESCRIPTION OF THE INVENTION

Figure 1:
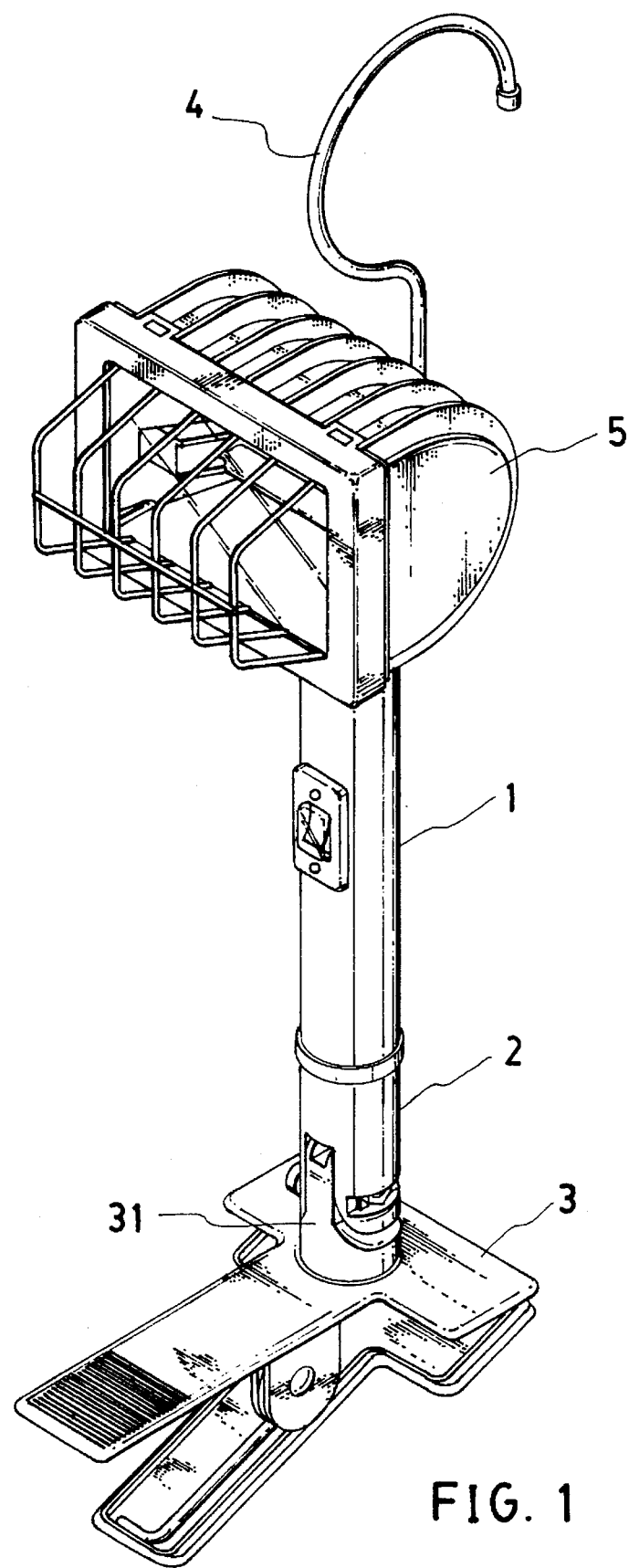
FIG. 1 is a solid profile of the present invention.
Figure 2:
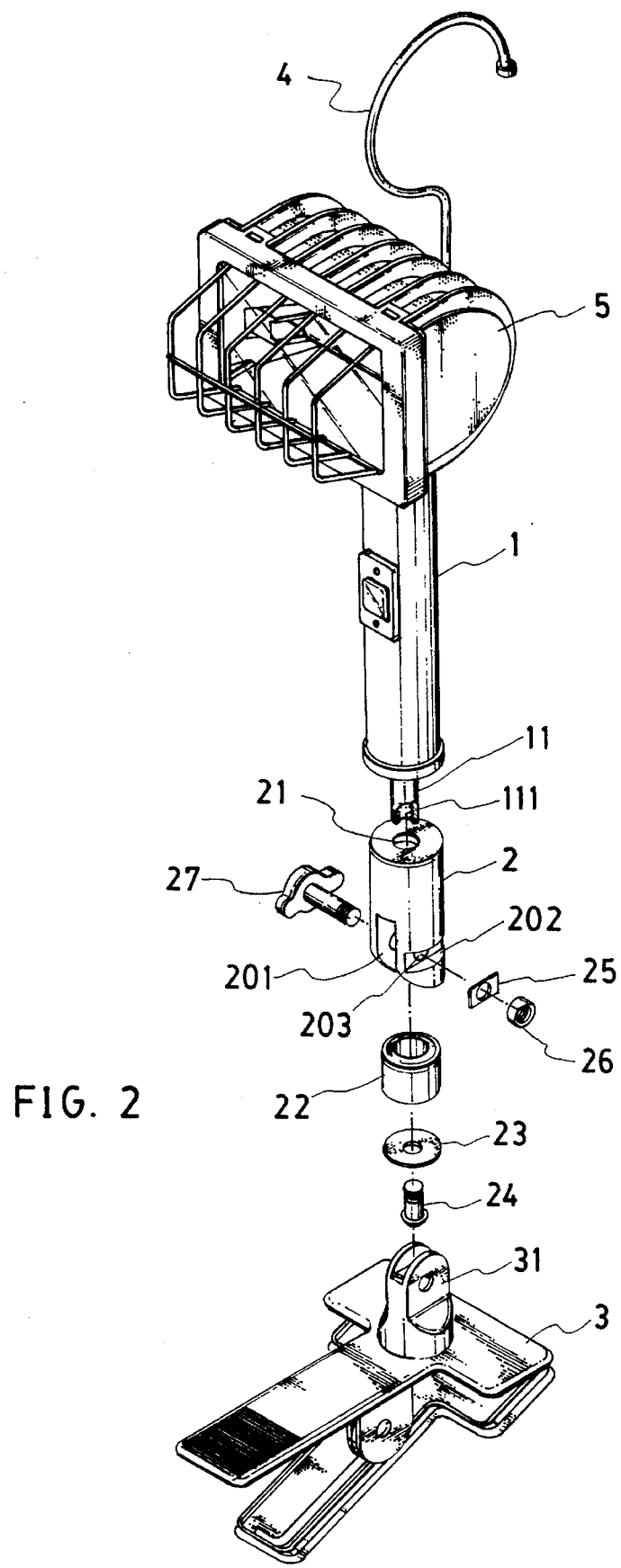
FIG. 2 is a solid-enlarged view of the present invention.

Referring to FIGS. 1 and 2 and particularly to FIG. 1, the present lamp holder is comprised of a post-type lamp stem 1, connection body 2, holder clamp 3, hanger 4 and lamp head 5. The lamp stem 1 is a hard, tubular, body and the top side is connected together with lamp head 5 and hanger 4, and the bottom side has a projecting post 11; connection body 2 is provided for upwardly connecting lamp stem 1 and downwardly connecting holder clamp 3; holder clamp 3 is provided for clamping the lamp holder in a fixed position.

Figure 3:
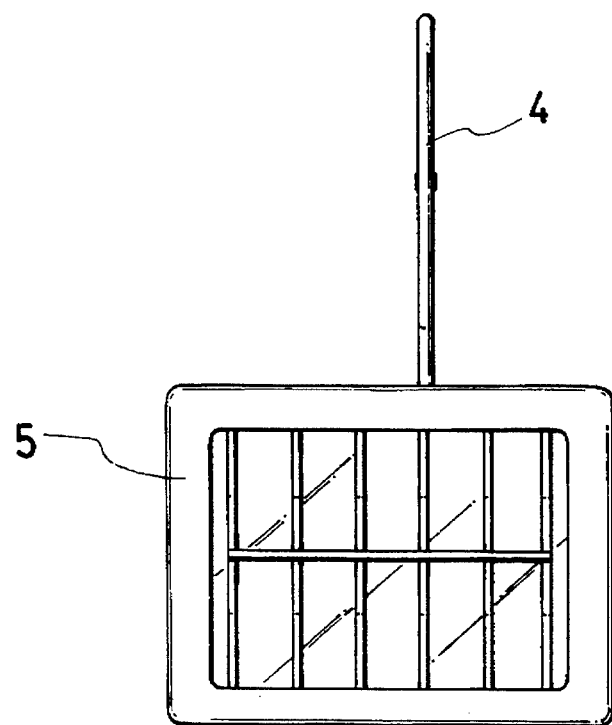
FIG. 3 is an assembly-perspective view of the present invention.
Figure 3:
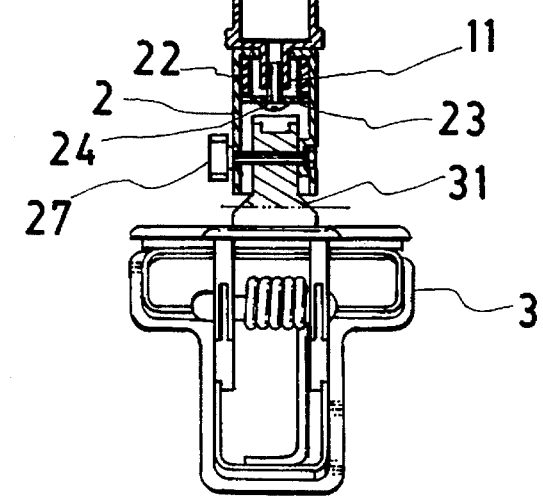

Referring to FIGS. 2 and 3, the bottom end of the lamp stem 1 has a projecting post 11 that is inserted in the hole 21 on the top of the hollow, post-type, connection body 2. A tubular Plastic bushing 22 and washer 23 are respectively mounted on the projecting post 11 within the connection body 2 and upwardly threaded into the thread hole 111 in the projecting post 11 of lamp stem 1 by means of a screw 24 to fix the lamp stem 1 with the connection body 2. The height of the tubular plastic bushing 22 is greater than that of the projecting post 11. The upper and lower ends appear in a smooth manner. Such fixing allows the structure as a whole to be fixed vertically, while free rotation is permitted in a lateral manner.

The lower side of connection body 2 has a longitudinal groove 201, and the bottom end of connection body 2 forms an arc in the same direction as the groove 201. A long notch 202 is made externally to the side of groove 201 for receiving a long washer 25 to be fitted therein. notch 202 contains a horizontal through hole 203. The projecting seat 31 of holder clamp 3 corresponds to the mounting of the connection body 2, groove 201 and hole 203 for fitting each together. A hand screw is inserted through the hole 203, washer 25 and nut 26 which allows the lamp stem 1 to swing with a full angle. As packing located by hand screw 27, the lamp stem 1 will not get loose after assembly.

Figure 4:
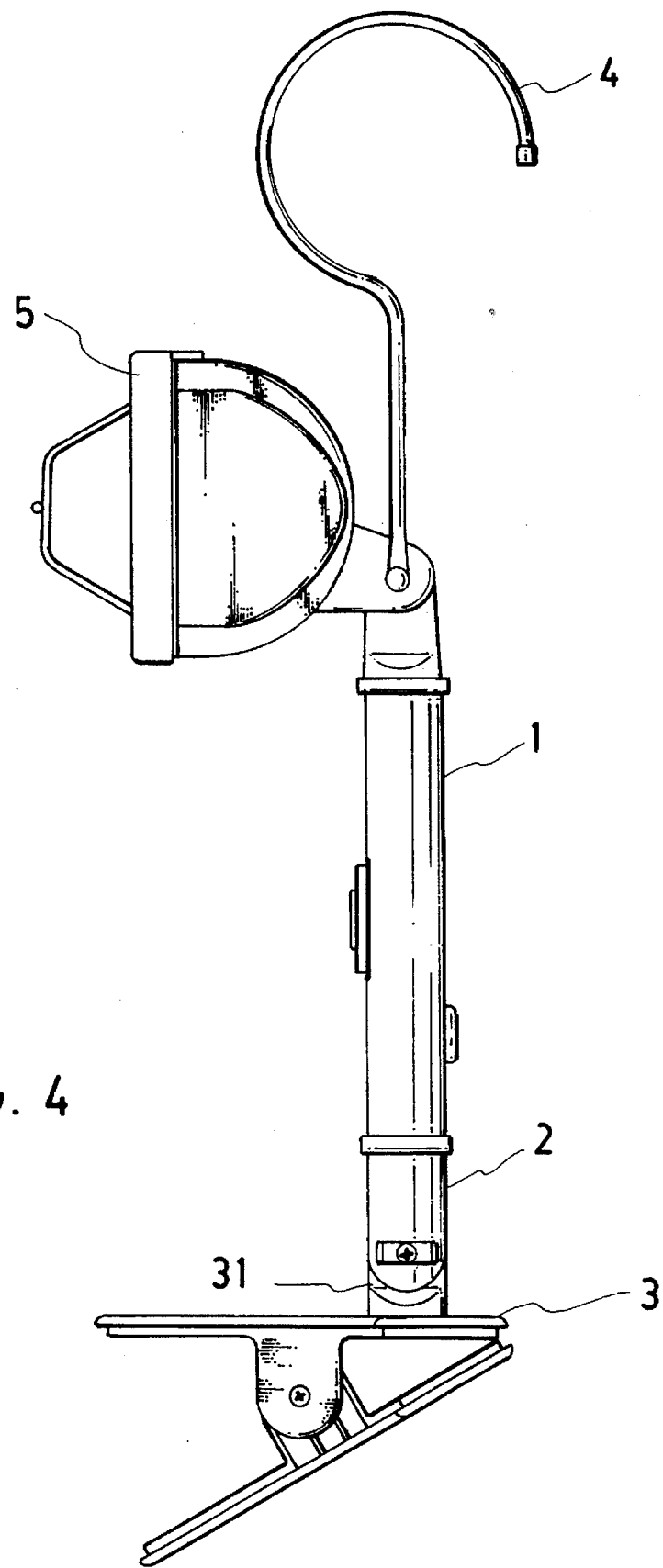
FIG. 4 is a side view of the present invention.

Referring to FIGS. 3 and 4, the lamp holder having been constructed and fastened on the object, by means of holder clamp 3, will allow its upper side gyration and forwards and backwards swinging to form a lamp holder with a fully adjustable illumination angle.

To enable lamp stem 1 and connection body 2 swinging motion, the lower edge of the connection body forms an arc in the same direction as the long groove 201.

The rear side of lamp head 5 may include a hanger 4 to enable the lamp holder, of the present invention, to be hung. A hanger will allow a wider variety of positioning uses to be made available for the lamp holder of the present invention.

What is claimed is:

1. A clamp-type lamp holder comprising:

a lamp body, a holder clamp, a hanger, and a lamp head, said lamp stem comprising a stem body and a connection body;

a projecting post provided on a bottom end of said stem body which is inserted into a first hole provided in a top portion of said connection body;

a tubular plastic bushing for sleeving about said projection post within said connection body;

a threaded screw which is upwardly threaded into a thread hole in said projecting post of said stem body so as to affix said stem body with said connection body to form said lamp body via a first washer which is disposed below said tubular plastic bushing;

a longitudinal groove formed near a lower end of said connection body;

a transversal notch formed near said longitudinal groove for receiving a second washer to be fitted therein, said transversal notch including a horizontal through hole;

a hand screw to be inserted through said horizontal through hole in said transversal notch and another through hole provided in a projecting seat of said holder clamp so as to allow said stem body, said connection body, and said lamp clamp to be affixed together while allowing said lamp body to swing in a desired angle.

2. A clamp-type lamp holder as claimed in claim 1 wherein said connection body has an arc-shaped lower edge cut in the same direction as said longitudinal groove so as to facilitate a swinging of said lamp body.

* * * * *